No. 786,256. PATENTED APR. 4, 1905.
H. W. AXFORD.
INCUBATING METHOD.
APPLICATION FILED NOV. 4, 1903.

Witnesses:
Chas. O. Shervey
Mattie B. Bliss.

Inventor:
Harris W. Axford
by H. T. Bitner
Atty.

UNITED STATES PATENT OFFICE.

HARRIS W. AXFORD, OF CHICAGO, ILLINOIS.

INCUBATING METHOD.

SPECIFICATION forming part of Letters Patent No. 786,256, dated April 4, 1905.

Application filed November 4, 1903. Serial No. 179,772.

*To all whom it may concern:*

Be it known that I, HARRIS W. AXFORD, a citizen of the United States of America, residing at Chicago, in the county of Cook and State of Illinois, have invented certain new and useful Improvements in Incubating Methods, of which the following is a specification.

My invention relates to certain new and useful improvements in incubating methods.

The aim of my invention is to provide a method by which a larger number of eggs can be hatched in an incubator of a given size and by which much more perfect incubation and nourishment can be obtained than is possible by the methods heretofore in use.

To this end my invention consists in certain novel features of procedure, which are fully set forth herein and illustrated as far as may be in the accompanying drawings.

Figure 2:
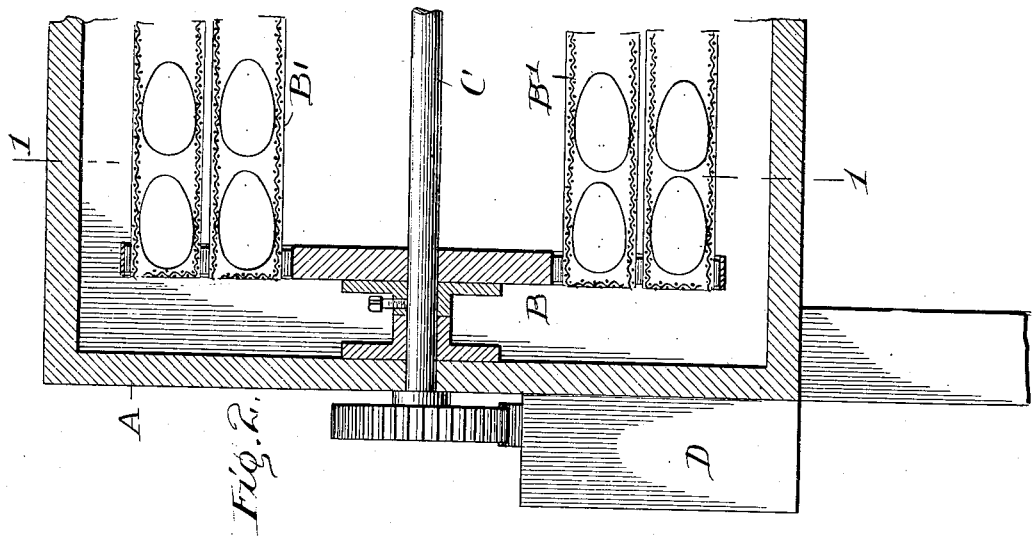
Figure 1:
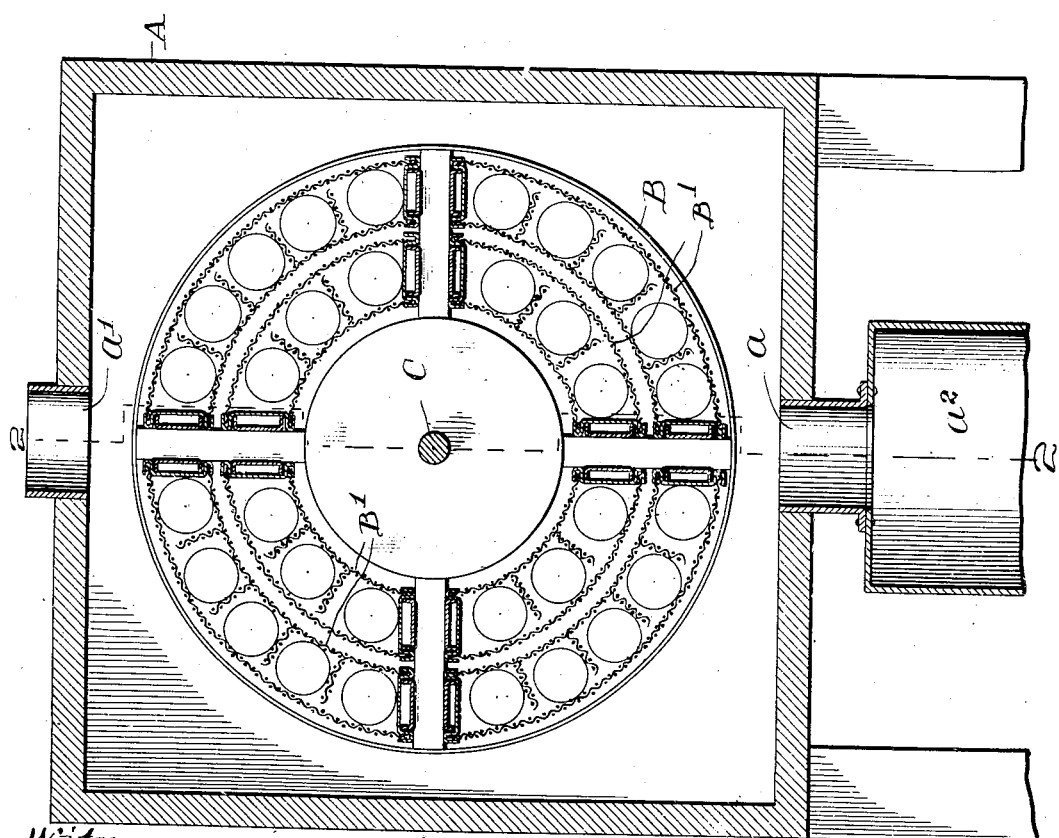

In the aforesaid drawings, Figure 1 is a transverse section through a form of incubator which I use in practicing my method, and Fig. 2 is a longitudinal section through the same.

Referring to the drawings, A indicates a suitable oven provided with inlet and exhaust flues $a$ $a'$, respectively. A chamber $a^2$ is provided below the inlet-flue $a$, and in this chamber a suitable heating apparatus may be placed. Within the oven is journaled a rotatable drum B, constructed in any desired way, and this drum bears a plurality of removable egg-trays B'. Each of these egg-trays is cut up into longitudinally-extending portions, each of which is of such size as to receive a number of eggs laid end to end, as shown in Fig. 2, but which fits the egg comparatively closely in other direction, as indicated in Fig. 1. Each of these trays is provided with a suitable cover, which holds the eggs firmly in place, so that when the tray is filled and its cover placed in position it may be inverted without the eggs piling up or being broken. The drum B is mounted upon a shaft C, which is driven by a motor of any desired sort, the motor being diagrammatically shown at D.

In practicing my improved method of incubation the egg-trays of my incubator are filled with eggs, as shown in the drawings, and the motor is started, so that the drum is rotated continuously about its axis. Each egg therefore passes in each rotation of the drum completely about a circle and is therefore completely inverted. As the incubation proceeds the drum is kept in practically continuous motion, so that throughout the entire hatching period the eggs are turned over with great frequency and also move through practically the entire vertical height of the oven.

The advantages of this method will be very evident when it is remembered that the germ of the egg floats at the top inside the shell and sends its blood-vessels downward into the egg to obtain nourishment. With the ordinary incubators it is necessary to turn the eggs over at least once in twelve hours to cause them to hatch properly, and this is ordinarily done by hand. With my improved method this very onerous task is entirely dispensed with. Furthermore, much better nourishment is provided, for the reason that the germ not only works from one side of the shell for one period and from the opposite side for the next, but is continuously moved inside the shell and is therefore continuously brought in contact with new nourishing matter. A further advantage of this method consists in the fact that the egg being in continuous movement is warmed equally upon all sides, and consequently can be hatched with a lower degree of heat than is necessary in other incubators. In other words, there is no cold side to the egg. A still further advantage consists in the fact that with this method a much larger number of eggs can be hatched in an incubator of the same size than can be hatched by any incubator where the eggs remain stationary. This arises from the fact that the eggs are moved with great frequency up and down the incubator, and consequently are all at substantially the same temperature, the motion of each egg from the top to the bottom of its movement being accomplished quickly enough for the "heat inertia," if such a term be proper, of each egg to keep it at an average temperature of the oven. In an ordinary incubating-oven the difference in temperature between the top and bottom is very great, and inasmuch as a difference of two or three degrees either way from the proper temperature is sufficient to kill an egg there is only one vertical height at which eggs can be successfully hatched, and consequently no incubator but a single-layer incubator can be successful unless the eggs are in continuous motion. With my improved method a quantity of eggs sufficient to form several layers can be hatched in the same oven, each egg being moved up and down through the oven with sufficient rapidity to keep it at a constant temperature.

I am aware that heretofore it has been proposed to make incubators having a drum which could be turned by hand for the purpose of inverting the eggs from time to time, and I do not claim as my invention this method of procedure. The advantages, however, of continuously moving the eggs are very obvious in view of the above description of my invention.

I realize that my procedure can be varied to a considerable extent and that apparatus for carrying the method into effect is by no means limited to that herein shown and described.

I claim as new and desire to secure by Letters Patent—

The herein-described improvement in the art of incubation which consists in warming the eggs for the required time and keeping them in practically continuous rotation during the period of incubation, whereby each germ is brought successively in contact with all parts of the nourishing material of the egg.

In witness whereof I have signed the above application for Letters Patent, at Chicago, in the county of Cook and State of Illinois, this 21st day of October, A. D. 1903.

HARRIS W. AXFORD.

Witnesses:
CHAS. O. SHERVEY,
RUSSELL NILES.